United States Patent [19]
Peterson

[11] 3,860,930
[45] Jan. 14, 1975

[54] RADAR ANTENNA SCAN APPARATUS
[75] Inventor: Robert K. Peterson, Garland, Tex.
[73] Assignee: Texas Instruments Incorporated, Dallas, Tex.
[22] Filed: Aug. 23, 1973
[21] Appl. No.: 390,998

[52] U.S. Cl. ............................. 343/705, 343/766
[51] Int. Cl. ........................................... H01q 1/28
[58] Field of Search ............... 343/759, 763–766, 343/705

[56] References Cited
UNITED STATES PATENTS
| | | | |
|---|---|---|---|
| 2,411,472 | 11/1946 | Slobod | 343/766 |
| 2,629,828 | 2/1953 | Cady et al. | 343/765 |
| 2,688,700 | 9/1954 | Lewis | 343/759 |
| 2,734,710 | 2/1956 | Noble | 343/766 |
| 3,604,009 | 9/1971 | Behnke | 343/763 |
| 3,646,564 | 2/1972 | Drislane | 343/766 |

Primary Examiner—Eli Lieberman
Attorney, Agent, or Firm—Harold Levine; Rene E. Grossman; Alva H. Bandy

[57] ABSTRACT

A radar antenna scan drive employs a planetary type drive. An RF antenna is fixed to rotate with a planet gear while the planet rotates around a sun gear. The swept volume of the RF antenna, as it scans, is shaped to be noncircular by the ratios selected for the planetary drive. The swept volume shape is utilized to package a larger RF aperture antenna in a fixed available space that is not circular.

3 Claims, 11 Drawing Figures

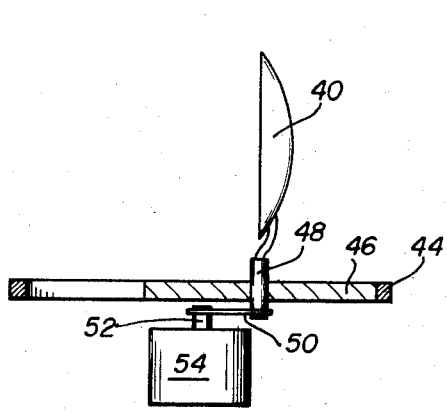
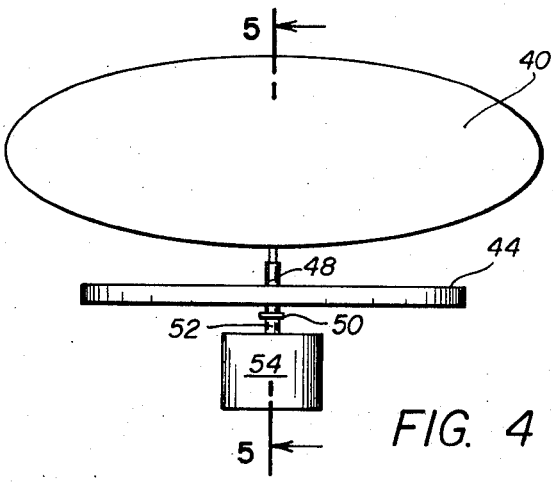
FIG. 5
FIG. 4
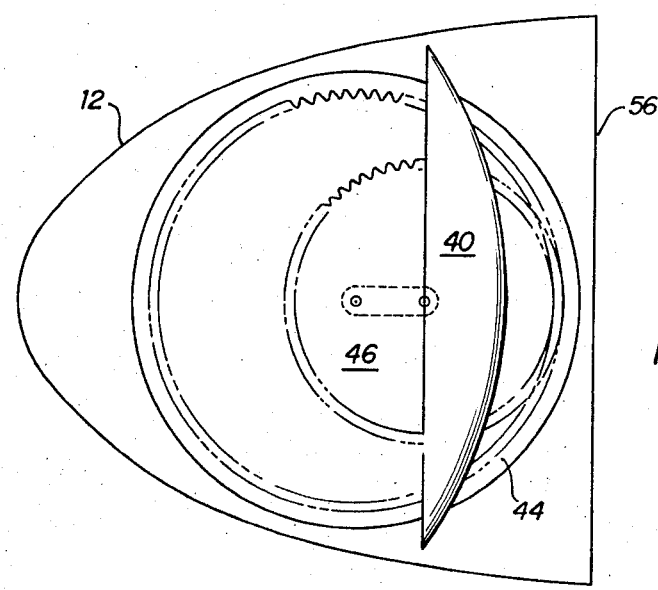
FIG. 6
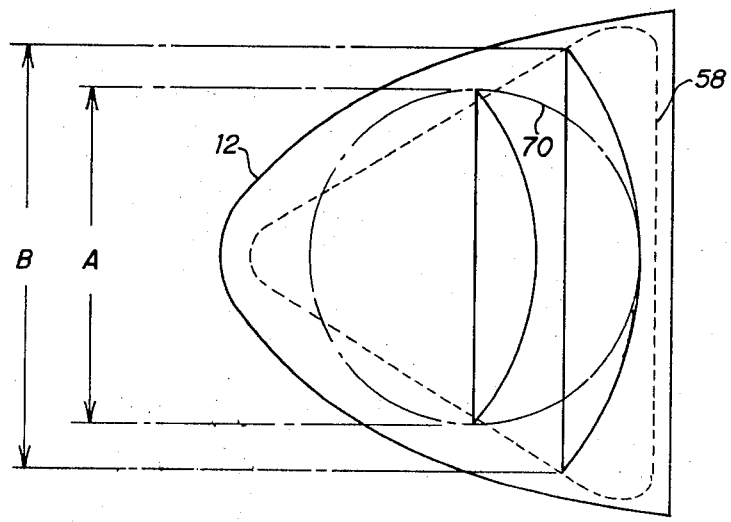
FIG. 9

RADAR ANTENNA SCAN APPARATUS

The present invention relates generally to improvements in aircraft radar antenna scan apparatus. In another aspect, this invention relates to a new and improved antenna scan apparatus which increases the possible antenna aperture size for an antenna system which is scanned or rotated within the limited space available in the nose of an aircraft.

Problems in radar systems in aircraft involve space and weight requirements. Most military aircraft do not permit heavy and bulky radar apparatus. Space and weight limitations in small lightweight aircraft can be even more critical.

Performance requirements of a radar are based on its intended mission. Often a larger antenna RF aperture is required for a mission than is possible in an existing aircraft radome with conventional antenna scan apparatus.

It is often necessary to place radar antennae in the front or nose section of the aircraft. Front sections, due to aerodynamic considerations, must be generally cone-shaped or tapered. Space requirements of the moving radar antenna and an associated scan drive present serious design problems.

Therefore, there exists a need for a compact and lightweight RF antenna and associated scan drive which may be accommodated in the confines of the nose of the aircraft.

By the present invention, there is provided a system with an antenna having an improved scanning apparatus which optimizes the use of space available for both a 360° scan and a sector scan application.

By the present invention, a directional antenna is rotated about an axis perpendicular to the scan plane. Means are provided to cause the axis of rotation of the antenna to translate with respect to the aircraft so that an antenna of maximum size may rotate within the nose of an aircraft, allowing the use of an antenna with a large aperture area.

More particularly, a shaped swept volume is achieved by mounting the antenna in the nose of an aircraft by means of an epicyclic drive. The drive in one form, a gear train, includes an internal tooth ring gear fixed to the aircraft in a plane with the axis thereof parallel to the axis of rotation of the antenna. A planetary gear is positioned to rotate inside and mesh with the ring gear. A drive mechanism rotates the planetary gear axis while the gear is meshed with the ring gear. The antenna is fixed to rotate with the planetary gear.

In accordance with a further aspect of the present invention, the pitch diameter of the ring gear is selected to be exactly one and one-half times the pitch diameter of the planetary gear for a 360° scan. The antenna is so positioned on the planetary gear such that when the planetary gear is in the rearmost position on the ring gear, the antenna extends with its maximum dimension perpendicular to the center line of the aircraft. For sector scan only applications, the ring gear to planet gear ratio may be varied for specific shaping results.

In accordance with the invention, an aircraft radar scan apparatus rotates the directional antenna about an axis perpendicular to a scan plane. The physical distance between the ring gear axis and the planetary gear axis influences the swept volume shape generated during scan. Therefore, the geometric location of rotational axes must be specifically matched with each particular application.

For a more complete understanding of the present invention and for further objects and advantages thereof, reference may now be had to the following detailed specification taken in conjunction with the accompanying drawings in which:

FIG. 4 is a front elevation of a 360° scan antenna involving a second embodiment of the present invention;

FIG. 5 is a section view taken on line 5—5 of FIG. 4;

FIG. 6 is a plan view of the apparatus of FIG. 4;

FIG. 9 is a view similar to FIG. 7 illustrating the path of movement of an antenna through a complete cycle by both a conventional apparatus and by the present invention;

Figure 1:
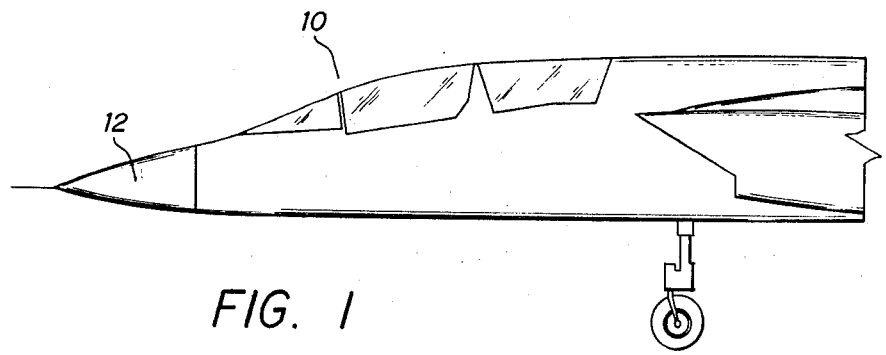
FIG. 1 is a side elevation view of a typical aircraft showing the aerodynamic profile of the nose containing an aircraft radar.

Referring now to the drawings wherein like reference characters designate like or corresponding parts throughout the several views, there is illustrated in FIG. 1 a portion of an aircraft, which for purposes of description is identified by reference numeral 10. Illustrated aircraft 10 is of the high performance type having a sleek profile.

Aircraft 10 is illustrative of aircraft which, due to high performance, have a generally tapered or conical nose 12. Nose 12 normally houses a forward looking sector scan radar apparatus. The size and shape of the space within nose 12 are dictated by the aerodynamic requirements of the aircraft. The size and space are fixed and dictate the limits that may be accepted by a radar unit.

Figure 2:
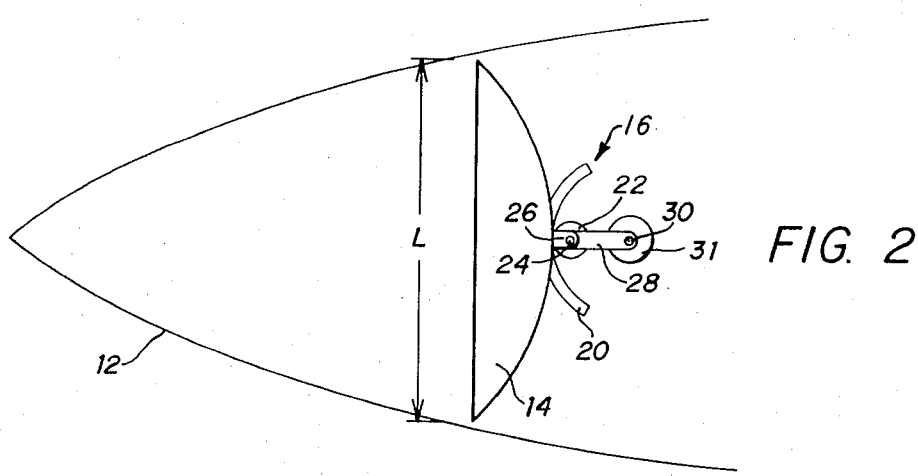
FIG. 2 is a plan view of a sector scan antenna with one embodiment of the improved scan apparatus.

In FIG. 2, one embodiment of an antenna structure 14 and scan apparatus of the present invention is illustrated in position within nose 12. Antenna 14 is of a conventional parabolic design with a reflector mounted therein for receiving and transmitting radar signals in a conventional manner. It is to be understood that other antenna shapes and structures could be utilized with the apparatus of the present invention and that the parabolic shape is shown for illustrative purposes only. The antenna aperture L is maximized by use of the improved antenna scan apparatus 16 of the present invention. The embodiment illustrated in FIG. 2 is utilized in scanning the antenna about an angle less then 360°. For purposes of description, the antenna is mounted for rotation through a 60° scan angle with the antenna rotating 30° either side of the center line 18 of the aircraft.

Scan apparatus 16 has an epicyclic gear train which is attached to antenna 14 to rotate the same as desired. In the embodiment illustrated, a portion of an internal ring gear 20 is fixed to the frame of aircraft 10 in a position located immediately behind the antenna 14 and in a plane parallel to the scan plane. Ring gear 20 has internal teeth thereon which mesh with a planetary gear 22. Planetary gear 22 has a central shaft 24 which is attached to an arm 26. Arm 26 is attached to antenna 14 so that antenna 14 rotates with and about the center of planetary gear 22. A second arm 28 has one end rotatably attached to shaft 24 and the other end attached to a drive shaft 30. Shaft 30 is positioned to rotate about an axis colinear with the center of ring gear 20. Arm 28 maintains planetary gear 22 meshed with ring gear 20 to translate shaft 24 and antenna 14 around gear 20.

A suitable driving motor 31 is operationally connected to drive shaft 30 to cause the shaft 30 to reciprocate through a 90° angle symmetrical to line 18. The pitch diameter of the ring gear is one and one-half times the pitch diameter of the planetary gear such that 60° rotation of the arm will result in 90° of rotation of the planet axis. The result is a ±30° scan of the antenna RF beam.

Figure 3:
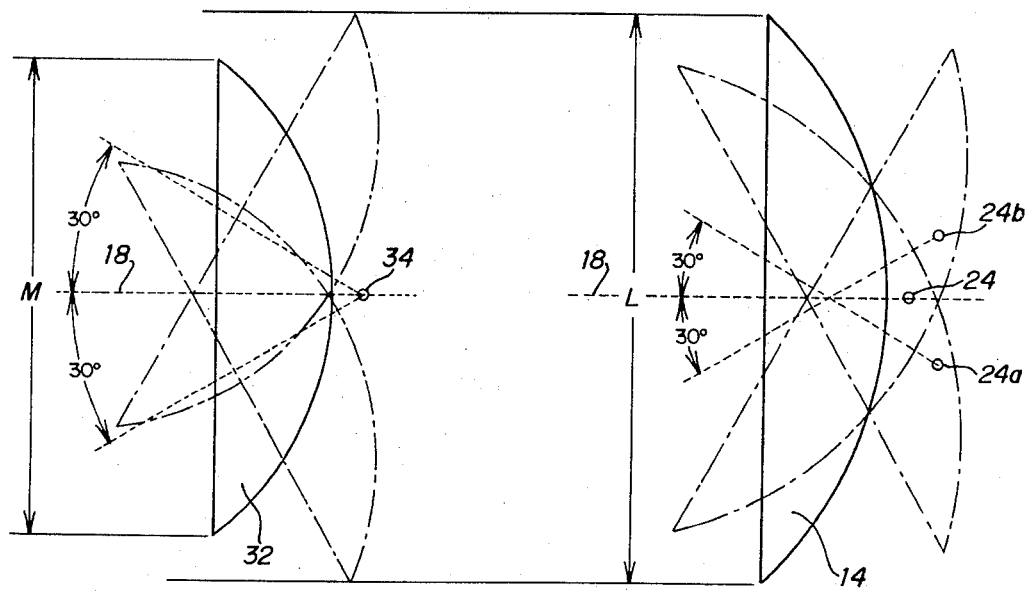
FIG. 3 is a plan view of two sector scan antennae rotated through identical scan angles illustrating the increased antenna aperture attained by the present invention.

By utilizing the improved antenna scan structure, a significant percentage increase in possible antenna aperture area can be achieved relative to conventional antenna scan apparatus. This improvement is illustrated in FIG. 3 wherein a conventional antenna 32 pivots about point 34 positioned behind the antenna 32. The maximum antenna aperture M is illustrated for an antenna which is rotated 30° either side of the center line 18 of the aircraft as required.

In contrast, antenna 14 is in phantom lines in the plus and minus 30° positions characterizing use of the present invention. The maximum antenna aperture is of width L. Aperture width L is 18 percent greater in this example than aperture width M. Therefore, a substantial increase in performance of the antenna 14 over the antenna 32 is achieved.

As can be seen in FIG. 3, when it is desired to rotate the antenna in a clockwise direction from the position illustrated in solid lines, the scan apparatus rotates the center of rotation of shaft 24 counterclockwise along gear 20 to a point 24a further away from the walls of nose 12. Likewise, when it is desired to rotate antenna 14 counterclockwise from the position shown in solid lines, shaft 24 moves clockwise along gear 20 to the position 24b. Thus, pivot 24 moves away from the wall of nose 12, allowing for an increase in the antenna size and aperture.

By utilizing the present invention, antenna 24 scans a set angle while providing a larger aperture, an increase in efficiency and performance of an antenna in a given space is achieved.

Turning now to FIGS. 4–8, a second embodiment of the invention is illustrated. In this embodiment, an antenna 40 is illustrated. An epicyclic gear train is utilized to rotate antenna 40 through 360°. The drive apparatus comprises a fixed internal tooth ring gear 44 attached to the frame of aircraft 10. A planetary gear 46 is mounted within ring gear 44 to mesh with and rotate about the interior of gear 44. The diameter of the ring gear 44 is selected to be exactly one and one-half times that of the pitch diameter of the planetary gear. A shaft 48 is fixed to planetary gear 46 and antenna 40. An arm 50 is rotatably attached to shaft 48. A drive shaft 52 is positioned to rotate about the center line of gear 44 and is attached to the arm 50. A suitable driving means 54, such as a motor, is attached to the drive shaft 52 to rotate drive shaft 52 about the center line of gear 44 and thus move the planetary gear 46 around the interior of gear 44.

As best seen in FIG. 6, the alignment is such that the arm 50 extends along the center line of the aircraft from the center of the ring gear in a direction toward the rear of the aircraft when the antenna is aligned with the center line and is facing in a forward direction. In this position, the rear surface of antenna 40 is closely adjacent to a rear bulkhead 56. As the arm 50 is rotated in a clockwise direction, as seen in FIG. 6, the antenna will make one-half rotation counterclockwise for every rotation of arm 50 in gear 44. During this movement, the antenna will move and its movement will be confined within the envelope 58 which is shown in dotted lines in FIG. 7.

Figure 7:
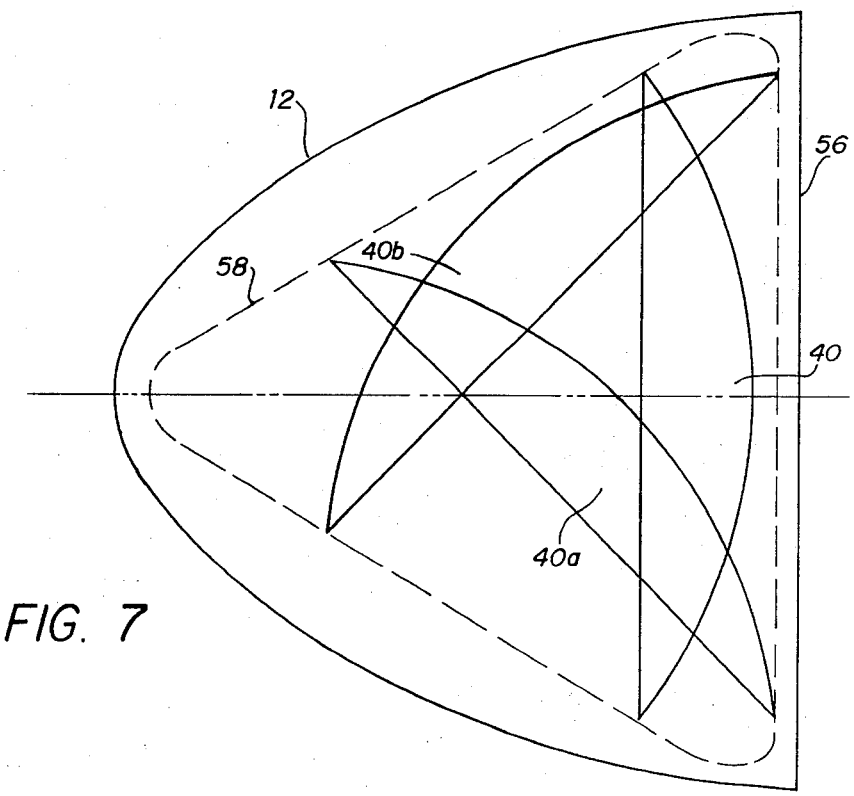
FIG. 7 illustrates the path of movement of the antenna as it is rotated in accordance with the present invention.

As planetary gear 46 moves around ring gear 44, antenna 40 will successively move between and assume the positions 40', 40a and 40b in FIG. 7. In position 40a, the antenna is directed to the front and port side of the aircraft. In position 40b, the antenna is directed to the rear and port side.

Continued movement of planetary gear 46 around ring gear 44 will cause the antenna to successively move to and between positions 40c, 40d, 40e (FIG. 8) and return to position 40' (FIG. 7). In position 40c, the antenna is pointing to the rear and in 40d to the rear and starboard. In position 40e, it is pointing forward and starboard. Upon returning to position 40', the antenna is again pointing forward.

By utilizing the present invention, antenna 40 will rotate within envelope 58 and substantially conform to the walls of a conical-shaped nose portion 12 permitting an increase in the effective aperture of antenna 40.

In FIG. 9, this increase in aperture is illustrated with the circle 70 representing the envelope of movement of an antenna rotated by conventional scan apparatus. Triangular envelope 58 illustrates the movement of the antenna in accordance with the present invention. The width of the aperture of the antenna which assumes the envelope of motion 70 is represented by dimension A which is substantially smaller than dimension B which represents the width of the aperture of an antenna rotated by the apparatus of the present invention.

By constructing antenna and scan drive apparatus in the manner described herein, the space envelope required for a 360° scan of the antenna has a general equilateral triangular shape with rounded corners. When viewed in a plane parallel to the scanning plane, the triangular shape has one leg extending transverse to the center line of the aircraft and the other two legs extending generally along and parallel to the tapered walls of the nose portion of the aircraft.

It is therefore to be understood, of course, that the apparatus of the present invention provides an antenna scan apparatus which is a simple, lightweight mechanism, yet substantially increases the aperture of the antenna which is limited to operate within a given space.

Figure 10:
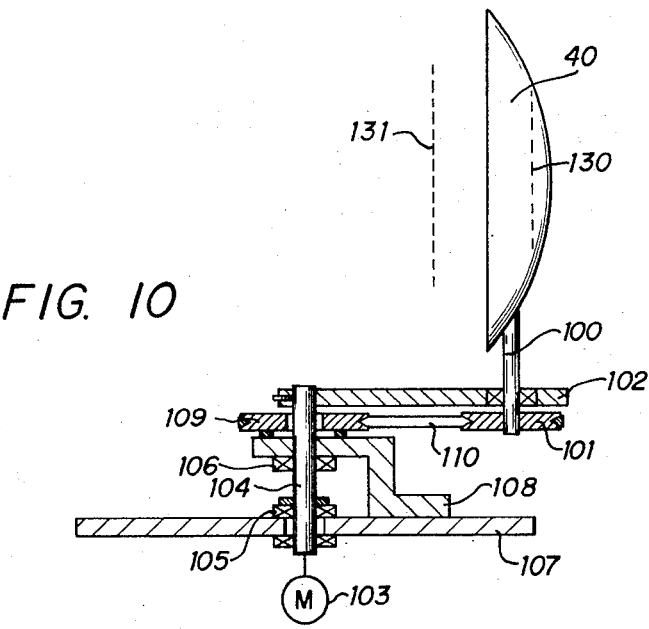
FIG. 10 illustrates a belt driven epicyclic system.

FIG. 10 illustrates a belt driven epicyclic system in which the antenna dish 40 is mounted to rotate on the shaft 100 of a planetary gear 101. Gear 101 is mounted on an arm 102 which is driven by a motor 103 by way of the shaft 104. The shaft 104 is journaled in bearings 105 and 106. Bearing 105 is supported in a frame member 107. A bracket 108 is mounted on frame 107 and support bearing 106. A fixed sun pulley 109 is rotatably mounted on the top of the bracket 108. A belt 110 then couples the pulley 109 to the pulley 101.

Figure 8:
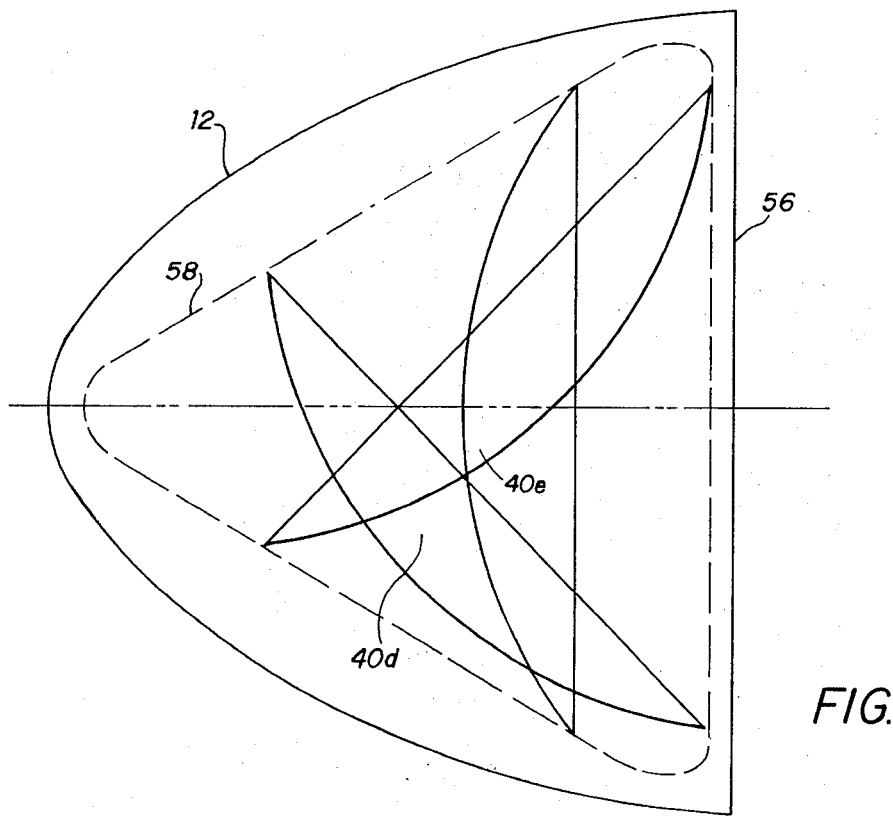
FIG. 8 is a view similar to FIG. 7 illustrating another portion of the scan cycle.

With the ratio of the sizes of pulleys 101 to 109 being 1:1.5, then the swept volume of the dish 40 will be the same as that illustrated in FIGS. 7 and 8. The drive of FIG. 10 eliminates the need for an internally toothed sun gear as of the type illustrated in FIG. 6 but provides the same motion. Preferably belt 110 is of the well known timing belt variety. The same variables are possible using the system of FIG. 10 as in altogether embodiments.

Figure 11:
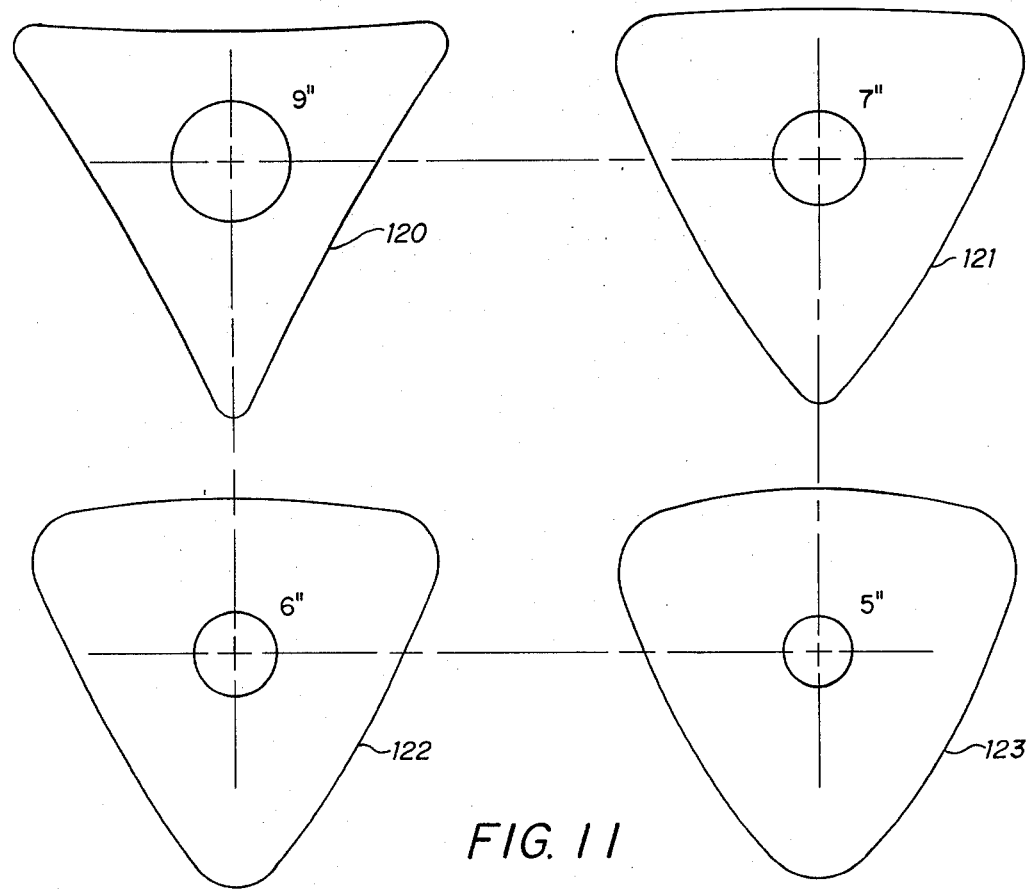
FIG. 11 illustrates shaping variations.

FIG. 11 illustrates variations in shape of the swept volume that can be achieved by varying the offset between the sun element and the planetary element. For example, variations in the distance between the axis of shaft 100 and shaft 104 for a given size of dish 40 will alter the nature of the swept volume. For example, with the dish having a width of 56 inches and the arm of 9 inch length, the swept volume had the pattern 120. With a 7 inch arm, the volume had a pattern 121. With a 6 inch arm, the volume had a pattern 122 and with a 5 inch arm, the volume had a pattern 123. The shorter the arm the more nearly the swept volume becomes rounded or circular. The longer the arm relative to a given dish width, the more the size of the swept volume becomes dished.

The shape of the swept volume can further be altered by offsetting the tips or maximum chord of the dish 40 from axis 100, FIG. 10. That is, the dish may be mounted for rotation on shaft 100 where the axis does not pass through the widest point on the dish. For example, the dish 40 might be moved forward so that the dotted line 130 coincides with the axis of shaft 100. Alternatively, a mounting bracket could be used so that the axis 100 corresponded with the location of dashed line 131.

It will be apparent from a discussion of FIG. 10 that the arm length as used with respect to the distance between the axes of shafts 100 and 104 has its counterpart in the systems using the sun gear and ring gear combination. The arm is the distance between the axis of the sun and the planet gears. The present invention, therefore, involves the method of shaping the swept volume of radar scan unit by supporting and moving the scan unit on and with a planet member of an epicyclic drive.

Having described the invention in connection with certain specific embodiments thereof, it is to be understood that further modifications may now suggest themselves to those skilled in the antenna art and it is intended to cover such modifications as fall within the scope of the appended claims.

What is claimed is:

1. A radar scan apparatus for translating a rotating antenna within a confined conical shaped space in an aircraft for increasing the size of the antenna aperture for an antenna system comprising:
   a. a drive shaft;
   b. means coupled to the drive shaft for rotating the drive shaft;
   c. a support means including a first support member attached to the drive shaft for rotation therewith, and a second support member rotatably mounted in said first support member, said second support member eccentrically disposed to the drive shaft;
   d. an antenna attached to the second support member for rotation therewith; and
   e. a drive means responsive to the rotation of the drive shaft for rotating the second support member and its antenna one half rotation in a direction opposite to that of the first support means for every rotation of the first support means whereby when said first support member is in the rearmost position the antenna extends with its maximum dimension perpendicular to the center line of the aircraft and moves the rotating antenna within a substantially triangular envelope to conform to the walls of the confined conical shaped space.

2. A radar scan apparatus according to claim 1 wherein said drive means includes a planetary gear mounted on a shaft of the second support member and at least a section of a ring gear attached to the aircraft within the confined conical space, said planetary gear meshing with the ring gear and driven by the first support member attached to the drive shaft.

3. A radar scan apparatus according to claim 1 wherein said drive means includes a first pulley attached to the second support member, a second pulley attached to the drive shaft, and a belt interconnecting the first and second pulleys, said first and second pulleys having a size ratio of 1:1.5.

* * * * *